US005988252A

United States Patent [19]

Carroll

[11] Patent Number: 5,988,252

[45] Date of Patent: Nov. 23, 1999

[54] POSTAGE STAMP APPLICATOR

[76] Inventor: William Carroll, 12861 Western Ave. Unit A, Garden Grove, Calif. 92641-4164

[21] Appl. No.: 08/843,140

[22] Filed: Apr. 28, 1997

Related U.S. Application Data

[63] Continuation-in-part of application No. 08/686,686, Jul. 26, 1996, abandoned.

[51] Int. Cl.[6] .................... B32B 31/00

[52] U.S. Cl. .................... 156/540; 156/528; 156/442; 156/579

[58] Field of Search .................... 156/530, 531, 156/532, 442, 540, DIG. 1, 579, 528

[56] References Cited

U.S. PATENT DOCUMENTS

| | | | |
|---|---|---|---|
| 195,209 | 9/1877 | Dick | 156/531 |
| 708,424 | 9/1902 | Strong | 156/531 |
| 740,901 | 10/1903 | Olsen | 156/531 X |
| 4,469,550 | 9/1984 | O'Steen, Jr. | 156/540 X |
| 4,712,114 | 12/1987 | Kikuchi | 156/579 X |

*Primary Examiner*—James Engel
*Attorney, Agent, or Firm*—Charles H. Thomas

[57] ABSTRACT

An apparatus is provided for dispensing postage stamps that are coated with a pressure-sensitive adhesive onto envelopes located therebeneath. Such postage stamps are wound in rolls and have a uniform width. In some postage stamp rolls the stamps are supported upon a carrier strip coated with a release agent, while in other arrangements the roll of stamps includes no separate carrier strip. The stamp application device of the invention is applicable to both types of postage stamp rolls. The stamp application apparatus employs a body that defines a stamp roll cavity and a postage stamp dispensing position. An advancement roller is located beneath the stamp roll cavity and above the postage stamp dispensing position and serves to advance the exposed end of the postage stamp roll toward the postage stamp dispensing position in incremental steps in response to operation of an advancement actuator mechanism. A guide mechanism directs the exposed end of the elongated strip of postage stamps from the advancement roller to the stamp dispensing position. A press mechanism is mounted on the dispenser body and is operable to press a postage stamp located at the postage stamp dispensing position against an envelope located directly therebeneath. When the device is utilized to apply stamps from a roll employing a carrier strip, a takeup roller is provided with a traction enhancing surface that frictionally seizes the extremity of the carrier strip. The carrier strip is advanced toward a carrier strip ejection location, while postage stamps are directed along a different path to the stamp application position.

8 Claims, 7 Drawing Sheets

POSTAGE STAMP APPLICATOR

BACKGROUND OF THE INVENTION

The present invention is a continuation in part of U.S. application Ser. No. 08/686,686 filed Jul. 26, 1996, abandoned.

FIELD OF THE INVENTION

The present invention relates to an apparatus for dispensing and applying postage stamps having undersurfaces coated with a pressure-sensitive adhesive and which are arranged in an elongated strip wound into a postage stamp roll.

DESCRIPTION OF THE PRIOR ART

For many years the U.S. Postal Service, as well as the postal services in other countries throughout the world, have sold postage stamps having a reverse surface coated with a moisture-sensitive adhesive, such as mucilage. Such postage stamps have been sold both in rolls and in sheet form in which individual stamps are connected together by perforations delineating the edges of one stamp from the next. To apply such stamps it is first necessary to moisten the reverse side of the stamp and press it on to the article to be posted, typically a paper envelope or a paper or cardboard container.

Recently, the U.S. Postal Service has begun to sell postage stamps, the reverse sides of which are coated with a pressure-sensitive adhesive, rather than a moisture-sensitive adhesive. Such postage stamps are often mounted one after another along a thin, narrow carrier strip, which is typically paper or thin plastic, coated with a release agent on the surface of the strip upon which the postage stamps are carried. Even more recently the U.S. Postal Service has introduced postage stamps, the undersurface of which are coated with a pressure-sensitive adhesive, and the face surfaces of which are coated with a release agent. Postage stamps of this type are initially connected one to the next in an elongated strip which is then spirally wound into a postage stamp roll without the necessity for a separate carrier strip coated with a release agent. Rather, the release agent coating on the faces of the stamps prevents the undersurfaces of stamps overwound thereabout from adhering thereto.

The conventional technique for dispensing such postage stamps initially mounted on a carrier strip coated with a release agent is to manually unwind the exposed, accessible end of the carrier strip from the remainder of the postage stamp roll and, by inserting a fingernail between the carrier strip or remainder of the stamp roll and a corner or edge of the postage stamp, manually peel the postage stamp away from the release agent therebeneath. The postage stamp is then pressed against the article to be posted in a conventional manner, but without moistening the reverse side, since the pressure-sensitive adhesive employed does not require moisture for activation. Rather, pressure is exerted on the postage stamp as it is positioned atop the article to be posted, thereby affixing the postage stamp to that article.

At present there has been no suitable implement for aiding a user in dispensing and applying postage stamps bearing pressure-sensitive adhesive on their reverse surfaces. Rather, the process of detaching the postage stamps from the carrier strip and applying them to articles to be posted has been performed entirely in a manual fashion.

SUMMARY OF THE INVENTION

A principal object of the present invention is to provide an apparatus or device which greatly facilitates both the dispensation and affixation of postage stamps backed with a pressure-sensitive adhesive. A device according to the present invention may be utilized both with postage stamps having undersurfaces coated with a pressure-sensitive adhesive and initially mounted on an elongated carrier strip, and also postage stamps having undersurfaces coated with a pressure-sensitive adhesive and faces coated with a release agent. By utilizing the present invention postage stamps can be detached from each other and from any underlying carrier strip on which they may be mounted and applied to articles to be posted with far greater speed and efficiency than is possible using the manual techniques that have heretofore been employed. The much greater speed and efficiency of postage stamp dispensation and application is particularly important in offices and factories in which considerable numbers of articles are posted for delivery each day.

A related object of the invention is to provide a postage stamp applicator that ensures that the postage stamps separate from each other and from any carrier strip employed in a uniform manner and at a consistent and specific stamp dispensing location delineated by the dispenser. Thus, the user may operate the device with considerable speed with full knowledge and confidence that the postage stamp will be dispensed and applied at a precise location. This feature is important since as soon as the postage stamp leaves contact with a surface coated with a release agent, it is susceptible to attachment to any article with which its pressure-sensitive adhesive side comes in contact.

The postage stamp applicator of the invention ensures that each stamp separates from the other strips in the strip and from any carrier strip utilized and is thereupon in a condition for attachment to an article to be posted at a predictable location with each and every operation of the device. A user can thereby rapidly position the applicator and operate it so that the postage stamps consistently leave the dispenser body each and every time at a predetermined stamp ejection location delineated by the dispenser body. Different articles to be posted can thereby rapidly be moved into position directly beneath the stamp ejection location, and removed from that position just as rapidly once the stamp has been applied.

A further object of the invention is to provide a postage stamp applicator which not only dispenses postage stamps in a very consistent and predictable manner, but which also provides a means for concurrently pressing the stamps against an article to be posted. Specifically, the postage stamp applicator of the invention is preferably equipped with a pressure plate located near the stamp application location defined by the body of the dispenser. Once the stamp has reached the stamp application location, the device is manipulated to bring the pressure plate down onto the postage stamp, thereby pressing its pressure-sensitive, adhesive-coated surface against the article to be posted.

When utilized with a roll of stamps initially mounted on a carrier strip coated with a release agent, a further object of the invention is to provide a postage stamp dispenser which avoids interference with the dispensation and affixation of postage stamps dispensed therefrom by the trailing end of the release coated carrier strip from which stamps already have been removed. This function is performed by providing the postage stamp dispenser of the invention with a tensioning system that frictionally engages the carrier strip beyond the postage stamp dispensing position and redirects it at an acute angle relative to the path of travel of the postage stamps along a dispensing path leading to the dispensing position. The end of the carrier strip from which postage stamps have already been removed is thereby pulled out of the way to prevent it from hindering the affixation of the postage stamp currently at the dispensing position to an article to be posted.

Still another object of the invention is to provide a postage stamp dispenser with an indexing system that informs a user when a postage stamp is located precisely at the dispensing position. This object is preferably achieved by providing the postage stamp dispenser with a postage stamp feed path and a pressure plate that is transparent and visible externally of the dispenser as the postage stamp reaches the stamp application position defined by the body of the dispenser. Since postage stamps have a uniform width, once one postage stamp has been moved to the proper position for application by the transparent pressure plate, the user is assured that the next postage stamp will likewise arrive at precisely the same dispensing location, since the device operates to advance the exposed end of the strip of postage stamps at incremental intervals equal to the uniform postage stamp width.

In one broad aspect the present invention may be considered to be a device for dispensing a strip of postage stamps formed into a roll having an exposed end and on which a number of postage stamps of uniform width are separately arranged. The device of the invention is comprised of a dispenser body carrying the postage stamp roll and defining a stamp application location at its bottom. A drive roller is mounted in the dispenser body between the postage stamp roll and the stamp application location so as to engage the exposed end of the strip. The drive roller is operable to unwind the strip of stamps from the roll and sequentially advance the stamps thereon to the stamp application location. An advancement actuator is mounted on the body and is operable to turn the drive roller so as to sequentially advance the stamps to the stamp application location in advancement increments equal to the uniform width of the stamps. The device also includes a stamp pressing mechanism mounted on the body and operable to sequentially press the stamps onto envelopes located directly beneath the stamp application location.

In another broad aspect the invention may be considered to be a postage stamp applicator for applying postage stamps to envelopes wherein the postage stamps have undersurfaces coated with a pressure-sensitive adhesive and are of a uniform width and are initially joined together in a strip wound into a stamp roll having an exposed end. The postage stamp applicator of the invention is comprised of a dispenser body for supporting the stamp roll for rotational movement relative thereto and defining a stamp feed path that terminates at a stamp application position defined by the dispenser body. A drive roller is mounted in the dispenser body in the stamp feed path. A manually operable actuator is provided to rotate the drive roller so as to advance the strip of stamps toward the stamp application position in increments of advancement equal to the width of the postage stamps. A manually operable stamp affixation mechanism is mounted on the dispenser body and is operable to press a stamp at the stamp application position against an envelope located adjacent thereto.

Preferably, the postage stamp applicator of the invention is constructed of modular, internal components so that the same basic structure may be utilized to apply postage stamps wound in rolls both with and without carrier strips coated with release agents. The optional use of either a drive roller designed to engage a carrier strip takeup roller, or a drive roller formed with a plurality of traction disks and utilized in conjunction with a guide mechanism may be alternatively employed with the same dispenser body, actuator and stamp pressing or affixation mechanism. Thus, the unit may be adapted for use with the different types of pressure-sensitive, adhesive-coated postage stamps currently in use.

The invention may be described with greater clarity and particularity by reference to the accompanying drawings.

DESCRIPTION OF THE EMBODIMENT

Figure 1:
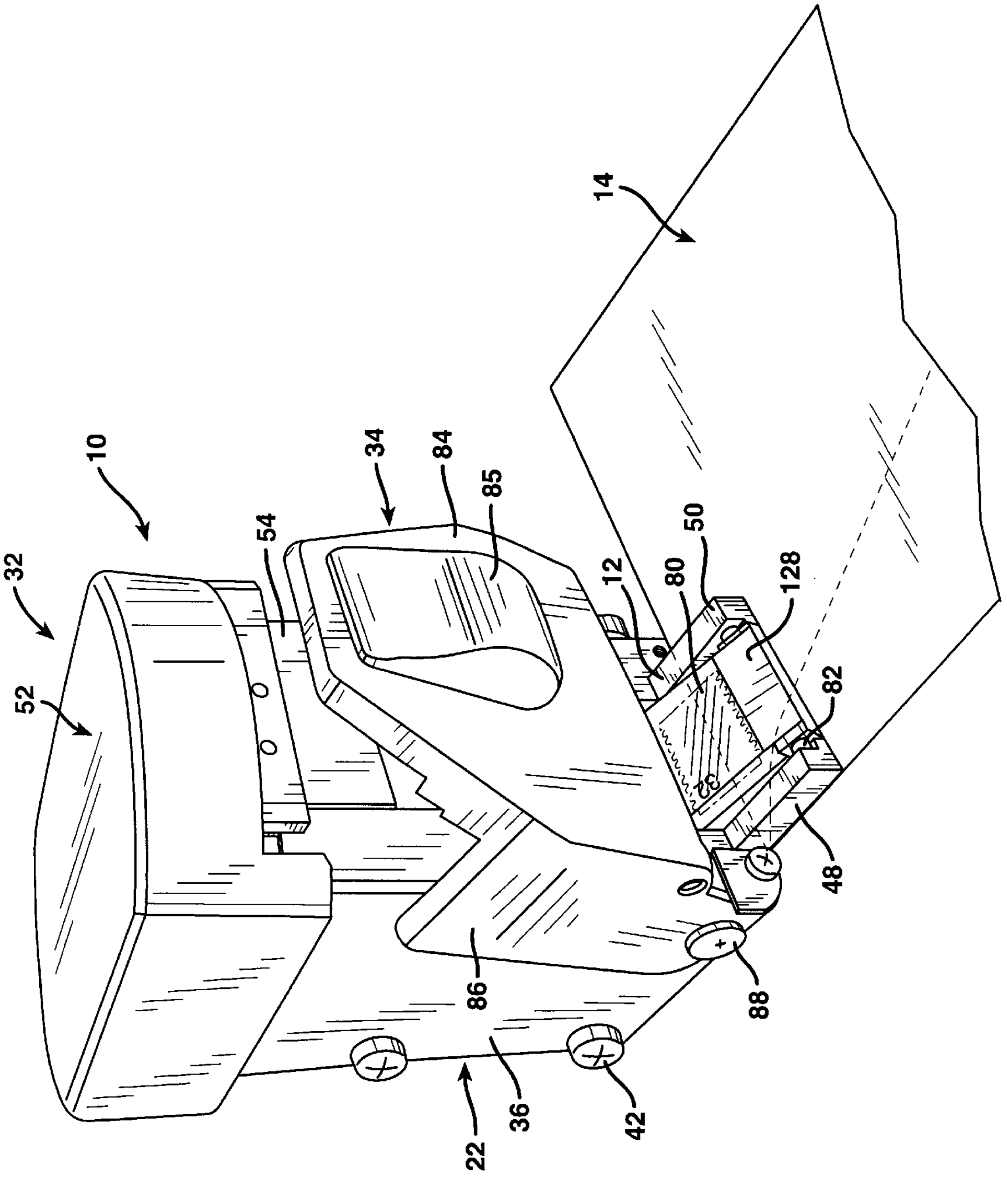
FIG. 1 is a perspective view of a preferred embodiment of a postage stamp applicator constructed according to the invention.
Figure 2:
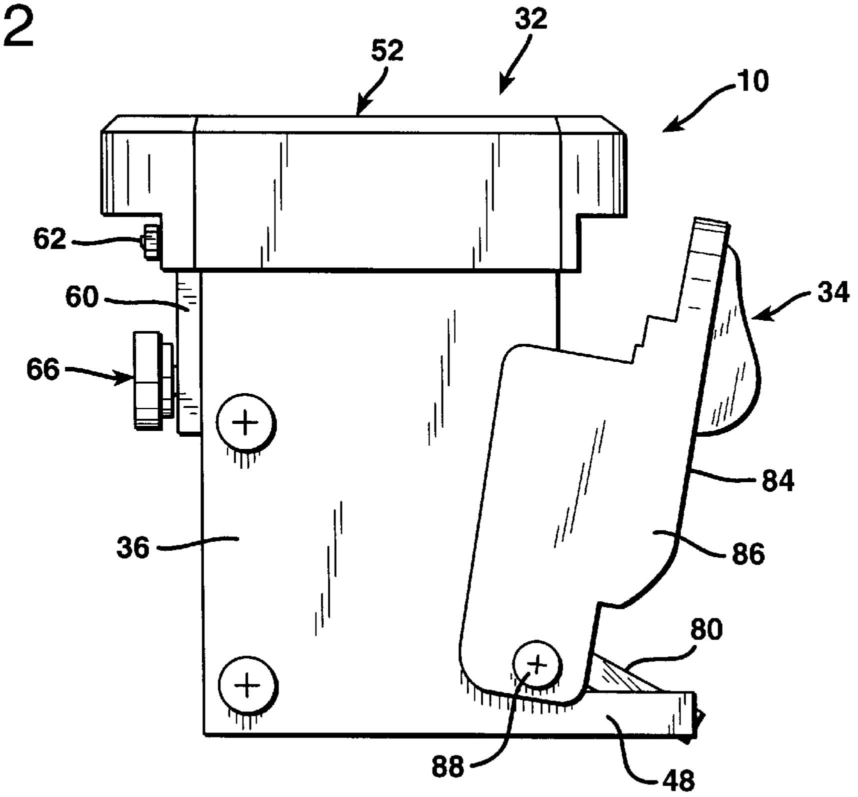
FIG. 2 is a side elevational view of the postage stamp applicator of FIG. 1.

FIGS. 1 through 7 illustrate a postage stamp applicator 10 fitted with internal components suitable for applying postage stamps 12 to mailing envelopes such as the standard, no. 10 envelope 14 depicted in the drawing figures. The postage stamps 12 are of a uniform width and are formed into a roll 16, visible in FIGS. 5, 6, and 7, having an exposed end 18. The postage stamps 12 are sequentially arranged, side by side, in seriatim order along the length of the elongated strip of stamps that is wound in spiral fashion to form the stamp roll 16. The undersurfaces of the stamps 12 are coated with a pressure-sensitive adhesive. In the embodiment depicted in FIGS. 5–7, the postage stamps 12 are initially mounted on an elongated carrier strip 20 that is coated with a release agent on at least the surface thereof facing the undersurfaces of the stamps 12.

Figure 5:
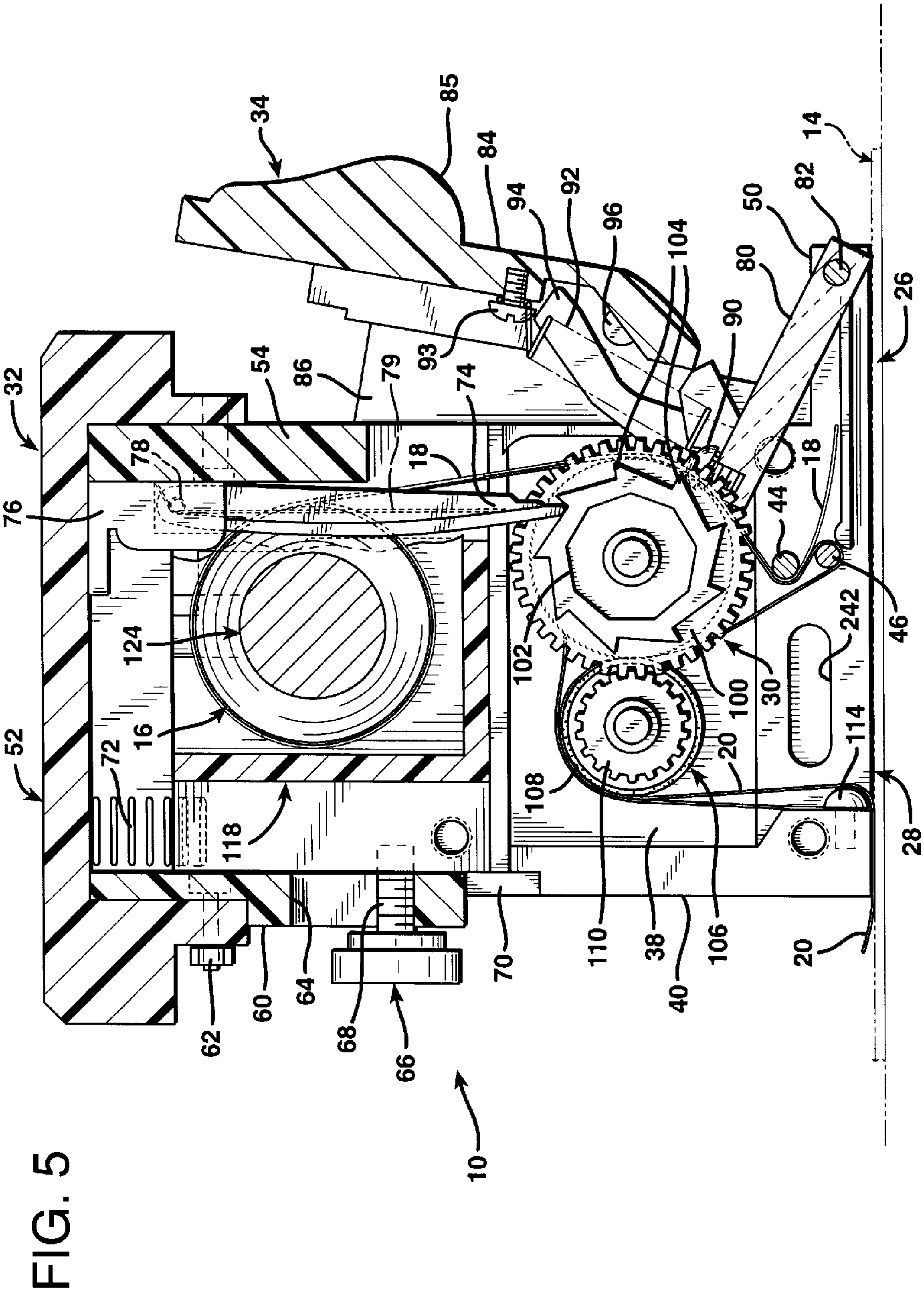
FIG. 5 is a side sectional view of the postage stamp applicator of FIG. 1 with internal components adapted for use with a roll of postage stamps initially mounted on a carrier strip coated with a release agent and shown prior to actuation.
Figure 6:
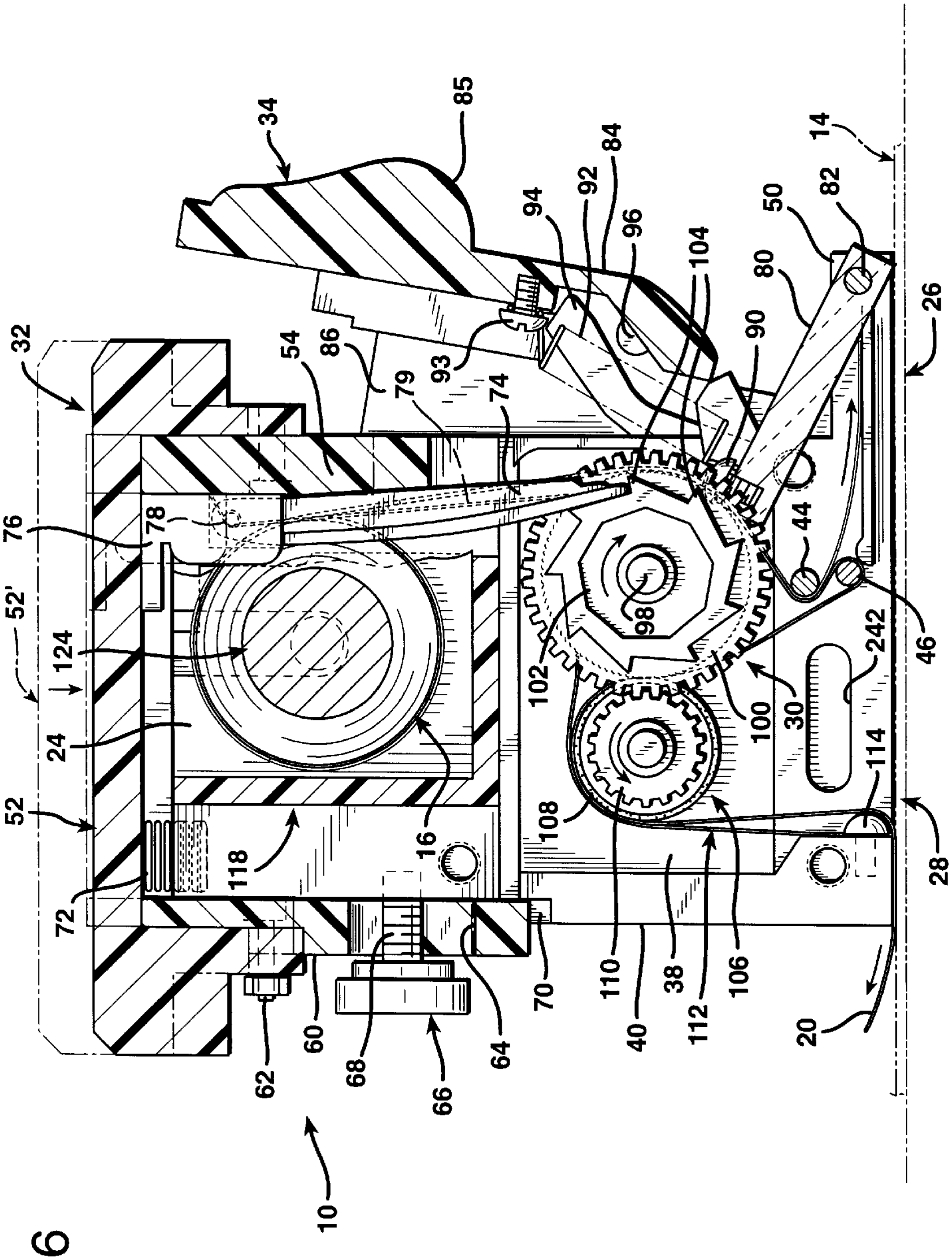
FIG. 6 is a sectional elevational view of the postage stamp applicator of FIG. 5 illustrating operation of the advancement actuator.
Figure 7:
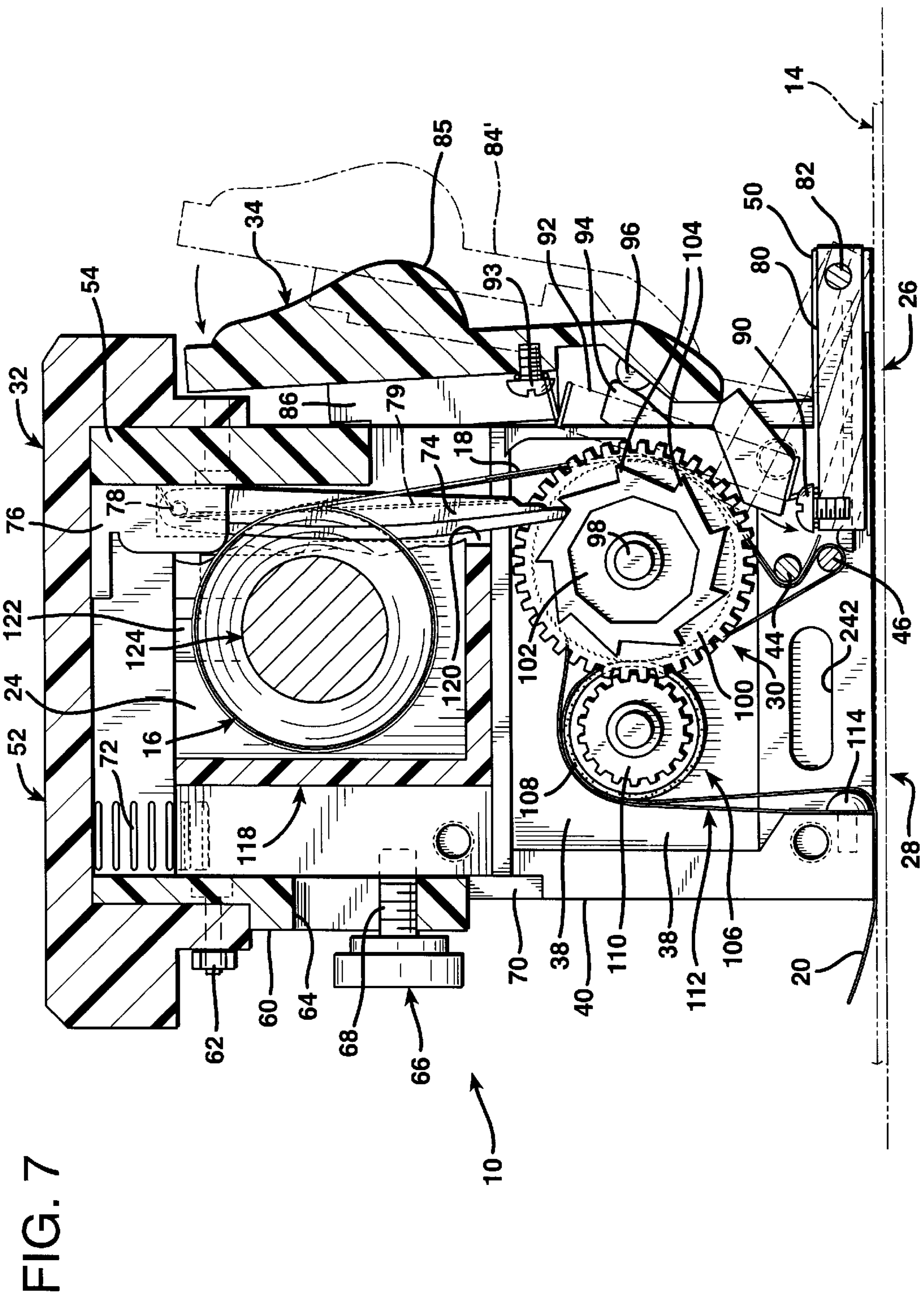
FIG. 7 is a sectional elevational view of the postage stamp applicator of FIG. 5 showing the operation of the stamp pressing or affixation mechanism.

The stamp applicator 10 includes a dispenser body 22 that supports and carries the postage stamp roll 16 internally within a stamp roll cavity 24 defined within the structure of the dispenser body 22. The dispenser body 22 defines a postage stamp dispensing or application position or location indicated at 26 at its lower extremity. The dispenser body 10 also defines a carrier strip ejection position 28, also at its lower extremity, but at a different location thereon spaced from the stamp application position 26, as best depicted in FIGS. 5–7.

The postage stamp applicator 10 also employs an advancement or drive roller 30 located beneath the stamp roll cavity 24 and above the postage stamp dispensing position 26. The exposed end 18 of the elongated strip of postage stamps 12 follows a stamp feed path that leads from the stamp roll cavity 24 to the stamp application position 26. The advancement or drive roller 30 is mounted in the dispenser body 10 between the postage stamp roll 16 and the stamp application location 26 so as to engage the exposed end 18 of the strip of postage stamps 12. The drive roller 30 is mounted in the dispenser body 10 in the stamp feed path followed by the exposed end 18 of the strip of stamps 12. The drive roller 30 is operable to unwind the strip of postage stamps 12 from the roll 16 and sequentially advance the stamps 12 thereon to the stamp application location 26.

The stamp applicator 10 is provided with a manually operable actuator 32 that operates in the manner of a plunger and which is mounted atop the dispenser body 22. The advancement actuator 32 is operated to rotate the drive or advancement roller 30 through an incremental arc of stamp advancement. The advancement actuator 32 thereby causes the advancement roller 30 to advance the exposed end 18 of the elongated strip of stamps 12 a linear distance equal to the width of the postage stamps 12 in incremental steps of advancement toward the stamp application location 26.

The applicator 10 also includes a stamp pressing or affixation mechanism indicated generally at 34. The stamp affixation mechanism 34 is mounted on the dispenser body 22 and is operable to sequentially press the stamps 12 onto an envelope 14 located directly beneath the stamp application location 26. When the stamp affixation mechanism or pressing mechanism 34 is operated, it presses a stamp 12 at the stamp application position 26 against an envelope 14 located immediately adjacent thereto and directly therebeneath.

As illustrated in FIGS. 1–4, the stamp dispenser body 22 has a generally rectangular configuration and is formed of a pair of upright side panels 36 and 38 between which a upright back panel 40 is secured by means of machine screws 42. At the front of the dispenser body 22 a pair of horizontally disposed arms 48 and 50 project forwardly from the lower extremities of the side panels 36 and 38 on either side of the stamp application position 26. Spacing at the front of the dispenser body is maintained by a pair of transverse, metal rods 44 and 46 which are seated in blind cylindrical seating pockets defined on the interior surfaces of the side panels 36 and 38. The transverse, metal rods 44 and 46 not only serve as spacers to maintain rectilinear alignment of the upright panels 36, 38 and 40, but perform other important functions as well, as will hereinafter be described.

The advancement actuating mechanism 32 includes a plastic cap 52 having short side walls that extend down around the upper extremities of the panels 36, 38, and 40 in sliding, telescopic engagement therewith. At the front of the cap 52 a rectangular, guide block 54 is secured by screws to project downwardly into a gap defined between inwardly projecting flanges 56 and 58 of the side panels 36 and 38, respectively. At the rear of the cap 52 there is another downwardly projecting, elongated guide block 60 secured to the rear, inside surface of the cap 52 by means of screws and nuts 62.

The elongated block 60 is provided with an elongated, vertically oriented slot 64. A thumbscrew 66 is provided and has a threaded shank 68 that extends through the elongated slot 64 and is engaged in an internally tapped, blind screw well formed in the outwardly facing surface of the rear panel 40. It should be noted that the tapped, blind bore in the rear panel 40 that receives the shank 68 of the thumbscrew 66 is rather shallow, so that the plastic shoulder of the thumbscrew 66 cannot clamp against the slotted guide block 60. The rear guide block 60 slides longitudinally in a vertical channel 70 defined in the outwardly facing surface of the rear panel 40. The thumbscrew 66 thereby serves to connect the cap 52 to the dispenser body 22, but permits the cap 52 to move in a longitudinal, reciprocal fashion relative to the dispenser body 22.

A pair of vertically oriented, blind, cylindrical pockets are defined in the upwardly facing edges of the side panels 36 and 38 at diagonally opposite corners of the dispenser body 22. These pockets receive compressible coil springs 72 therewithin. The coil springs 72 serve as actuator return springs to bias the cap 52 upwardly away from the dispenser body 22 to the extent permitted by interference between the shank 68 of the thumbscrew 66 and the lower edge of the slot 64. By the same token, downward movement of the cap 52 relative to the dispenser body 22 is limited by the abutting interference between the upper edges of the vertical panels 36, 38, and 40 and the underside of the roof of the cap 52.

Near the corner of the cap 52 adjacent the inturned flange 56 of the upright side panel 36 an elongated pawl 74 is attached to the underside of the cap 52. The pawl 74 is carried within a channel bracket 76 and is mounted for rotation relative thereto to rotate in a fore and aft direction about a transverse axle 78. The pawl 74 is biased toward the rear of the dispenser body 22 by means of a wire spring 80 that acts between the pawl 74 and the channel bracket 76 to urge the pawl 74 in a clockwise direction of rotation about the axle 78 to the extent permitted by the rear, transverse structure of the web of the channel bracket 76 that extends between its sides.

The stamp pressing or affixation mechanism 34 includes a transparent Lucite pressure plate 80 which is mounted by means of a hinge axle 82 for hinged rotation relative to the distal extremities of the forwardly projecting arms 48 and 50 near the lower edges of the upright side panels 36 and 38. The pressure plate 80 is thereby mounted for rotation relative to the dispenser body 22 at the lower extremity thereof.

The stamp pressing mechanism 34 also includes an actuating lever 84 formed in a generally U-shaped, cross sectional configuration and having side flanges 86 that embrace and are hinged to the dispenser body by means of screws 88. The shanks of the screws 88 pass through the side flanges 86 of the actuating lever 84 and are threadably engaged in blind, internally tapped, outwardly facing pockets near the lower front corners of the upright side panels 36 and 38. The outwardly facing, central surface of the actuating lever 84 is provided with a convex, bulbous finger grip 85 that facilitates manual operation of the actuating lever 84.

At its internal, unhinged end the transparent pressure plate 80 is provided with a screw 90 at its center that anchors one end a coil spring 92 that serves as a pressure application return spring. The opposite end of the pressure application return spring 92 is secured to the actuating lever 84 by means of another screw 93.

The stamp pressing mechanism 34 also includes a pair of pressure application posts 94 rigidly secured to the transparent pressure plate 80 remote from the axle 82 and on either side of the screw 90. The pressure application posts 94 are oriented generally perpendicular to the pressure plate 80 where they are attached thereto, but angle outwardly toward the lever arm 84 at locations approximately midway along their lengths. A transversely extending, pressure application rib 96 of generally semicylindrical cross section is secured to the inside surface of the actuating lever 84 at a distance of approximately seven-sixteenths of an inch from the axis of rotation of the actuating lever 84 formed by the screws 88.

When the stamp pressing mechanism 34 is not operated, the pressure application return spring 92, which is extended and under tension, partially contracts and draws the end of the pressure plate 80 remote from the hinge pin 82 upwardly toward the anchoring screw 93 in the actuating lever 84. This rotates the pressure plate 80 in a clockwise direction about the hinge axle 82, thereby partially relaxing the pressure application return spring 92 and moving the pressure plate 80 away from the stamp application location 26. The contraction of the pressure application return spring 92 also rotates the actuating lever 84 in a clockwise direction about the axis of rotation formed by the screws 88.

The stamp pressing mechanism 34 is actuated by pressing the stamp pressure actuating lever 84 inwardly toward the dispenser body 22 in counterclockwise rotation about the axis of rotation formed by the screws 88, as depicted in FIG. 7. When the actuating lever 84 is rotated inwardly toward the dispenser body 22 in this fashion, the pressure application rib 96 contacts the sides of the pressure application posts 94 and forces them inwardly toward the dispenser body 22 as well. As the pressure application posts 94 are forced inwardly, the pressure plate 80 is rotated downwardly and in a counterclockwise direction, as viewed in FIG. 7. This movement exerts a considerable downward pressure on the pressure plate 80 through the pressure application posts 94 when the pressure plate 80 reaches the stamp application location 26 as depicted in FIG. 7.

As the actuating lever 84 is moved from the relaxed position depicted in phantom in FIG. 7 to the actuated position depicted in solid lines in that drawing figure, the pressure application return spring 92 is stretched even further. The force applied to the actuating lever 84 must be sufficient to overcome the force within the spring 92 tending to force the pressure plate 80 up away from the stamp dispensing position 26. Once the actuating lever 84 is released, the pressure application return spring 92 will again retract, thereby pulling the unhinged end of the pressure plate 80 upwardly in a clockwise direction of rotation about the hinge pin 82 back to the position depicted in FIGS. 5 and 6.

As is evident, the actuating lever 84 is engageable with the pressure plate 80 by means of the pressure application rib 96 and the pressure application posts 94, and is moveable to rotate the pressure plate 80 toward the stamp application location 26. The pressure application return spring 92 acts between the actuating lever 84 and the stamp pressure plate 80 to urge the pressure plate 80 away from the stamp application location 26.

FIGS. 5–7 illustrate the preferred embodiment of the invention fitted with components suitable for applying postage stamps 12 to envelopes 14 in which the postage stamps 12 are initially mounted on an elongated carrier strip 20 coated with a release agent. In this embodiment the drive roller 30 is formed as a cylindrical-shaped structure having stub axles 98 that are rotatably mounted in corresponding pockets in the interior surfaces of the side panels 36 and 38. At its end proximate the side panel 36, the drive roller 30 is formed with a plastic spur gear 100 and a ratchet wheel 102, both of which are rigidly joined to and rotate with the drum-shaped central portion of the drive roller 30 across which the free end 18 of the roll of stamps 16 passes. The ratchet wheel 102 has ratchet teeth 104 that are sequentially engaged by the pawl 74 with each operation of the advancement actuating mechanism 32.

The transverse metal rods 44 and 46 serve not only as spacers between the upright side panels 36 and 38, but also form parts of a guide mechanism mounted on the dispenser body 22 between the drive roller 30 and the stamp application location 26. The transverse rods 44 and 46 direct the exposed end 18 of the strip of postage stamps 12 toward the stamp application location 26. In addition, the transverse rod 46 serves as a carrier strip turning post for separating the strip of postage stamps 12 from the elongated carrier strip 20 and for redirecting and guiding the carrier strip 20 toward the carrier strip ejection position 28.

The system is further comprised of a takeup roller 106. The takeup roller 106 includes a cylindrical, drum-shaped central region formed with a rubber sleeve 108 thereon. The roller sleeve 108 is compressible and has a traction enhancing surface. The takeup roller 106 also includes another spur gear 110 having a pitch diameter smaller than that of the gear 100 and with gear teeth meshed with those of the spur gear 100 at its end closest to the side panel 36. The meshed gears 100 and 110 cause the drive roller 30 and the takeup roller 106 to rotate together.

Since the gear 110 is smaller than the gear 100, the traction enhancing surface of the rubber sleeve 108 rotates at a greater linear speed than the corresponding surface of the drive roller 30. This ensures that the takeup roller 106 will always exert longitudinal tension on the carrier strip 20, so that it will be pulled away from the underside of the stamps 12 as they are advanced toward the pressure application location 26 due to the sharp angle at which the carrier strip 20 is pulled around the turning post 46. The takeup roller 106 engages the carrier strip 20 after the carrier strip 20 passes the carrier strip turning post 46. The takeup roller 106 advances the carrier strip 20 to the carrier strip ejection location 28, which is distinct and laterally displaced from the pressure application location 26.

Since the drive roller 30 and the takeup roller 106 are engaged together by means of the meshed gears 100 and 110, the takeup roller 106 exerts tension on the carrier strip 20 to advance both the carrier strip 20 and the strip of postage stamps 12 in response to rotation of the drive roller 30 by the actuator mechanism 32. The stamps 12 are pulled past the turning rod 44 and continue on toward the stamp application location 26, while the carrier strip 20 is pulled in a reverse direction about the turning rod 46 and is drawn over the takeup roller 106 and directed to the carrier strip ejection location 28.

In the embodiment illustrated in FIGS. 1–7 an arcuately curved leaf spring 112 is provided to guide the carrier strip 20 in an arcuate path about the traction enhancing surface of the rubber sleeve 108 of the takeup roller 106. The carrier strip guide spring 112 is secured at its lower end by a pair of machine screws 114 to the dispenser body 22. The lower end of the leaf spring 112 is thereby anchored to the dispenser body 122. The leaf spring 112 extends vertically upwardly and at its upper end is arcuately curved over the top of the takeup roller 106.

The leaf spring 112 exerts a spring biased pressure on the traction enhancing surface of the rubber sleeve 108. As a consequence, the leaf spring 112 not only guides the carrier strip 20 as it passes over the surface of the rubber sleeve 108, but also presses the carrier strip 20 against the traction enhancing surface formed by the rubber sleeve 108. This pressure is preferably exerted over an obtuse angle of contact with the traction enhancing surface of the rubber sleeve 108, typically about ninety-five degrees, as illustrated.

The free extremity of the spring 112 extends almost into contact with the drive roller 30 to ensure that the carrier strip must travel in the space between the leaf spring 112 and the traction enhancing surface of the rubber sleeve 108. The carrier strip guide spring thereby guides the carrier strip 20 from the carrier strip turning post 46 about the takeup roller 106 and toward the carrier strip ejection location 28.

In the embodiments of the invention illustrated the postage stamp applicator 10 is provided with a stamp roll support cartridge 118. The cartridge 118 is formed as a plastic, generally box-shaped structure, the bottom of which is closed except at a transversely extending slot 120 at its forward, lower edge. The cartridge 118 also includes a pair of vertically oriented slots 122 in its opposite side walls. The slots 122 have open upper ends and closed lower ends and receive the transversely extending lugs of a stamp roll support spool 124, which may be formed of aluminum. The lugs at the ends of the stamp roll support spool 124 project through the slots 122 in the side walls of the cartridge 118 and into vertically extending channel grooves in the interior side panels 36 and 38 of the dispenser body 22.

To utilize the embodiment of the invention depicted in FIGS. 1–5, the thumbscrew 66 is temporarily unscrewed and the advancement actuator mechanism 32 is lifted from the dispenser body 22 to provide access to the postage stamp cavity 24. The cartridge 118 is also lifted out of the postage stamp cavity 24, and the stamp roll support spool 124 is lifted up out of the cartridge 118 until the lugs at the ends thereof clear the ends of the slots 122 in the stamp support roll cartridge 118.

The stamp roll support spool 124 is thereupon inserted lengthwise and coaxially into the cylindrical center opening in a conventional roll 16 of postage stamps 12 supported on a carrier strip 20. Once the stamp roll support spool 124 has been positioned within the center opening of the roll of stamps 16, the lugs at the end of the stamp roll support spool 124 are inserted into the vertical slots 122 in the plastic cartridge 118. The tip of the exposed end 18 of the roll of stamps 16 is inserted down through the slot 120 in the cartridge 118. Also, it is necessary to remove the first few stamps 12 from the carrier strip 20.

The cartridge 118 with the roll of stamps 16 mounted therein is then inserted down into the stamp roll cavity 24 in the dispenser body 22. The exposed end 18 of the roll of stamps 16 is passed over the outer surface of the drive roller 30. The free, terminal end of the carrier strip 20, from which stamps 12 have by this time been removed, is then passed behind the transverse rod 44 and around the transverse turning post rod 46 and back up in between the drive roller 30 and the takeup roller 106. The free tip of the carrier strip 20 is wedged in between the leaf spring 112 and the outer surface of the sleeve 108 of the takeup roller 106.

The advancement actuating mechanism 32 is then positioned atop the dispenser body 22 and the threaded shank 68 of the thumbscrew 66 is then reengaged with its tapped bore in the back panel 40.

The actuator return springs 72 normally hold the roof of the cap 52 slightly above the upper extremities of the side panels 36 and 38 and the rear panel 40 of the dispenser body 22, as indicated in phantom at 52' in FIG. 6. However, to operate the device the cap 52 is pressed vertically downwardly on the dispenser body 22 to the position depicted in solid lines in FIG. 6. Pressure on the cap 52 compresses the actuator return springs 72 until the roof of the cap 52 meets the upper edges of the side panels 36 and 38 and the rear panel 40 in abutment therewith, as illustrated in FIGS. 5, 6, and 7.

The cap 52 travels in telescopic engagement with the upper extremities of the panels 36, 38, and 40 as the coil springs 72 are compressed. Also, at the same time the pawl 74 engages one of the teeth 104 of the ratchet wheel 102 as the cap 52 is depressed downwardly onto the dispenser body 22. The pawl spring 79 allows the tip of the pawl 74 to move with the engaged tooth 104 of the ratchet wheel 102 as the ratchet wheel 102 is rotated in a clockwise direction as the actuating mechanism 32 moves from its normal rest position 52' into its actuating position illustrated in solid lines in FIG. 6.

Depending upon the number of stamps that have been removed from the end of the carrier strip 20, several sequential depressions and releases of the advancement actuating mechanism 32 may be necessary to advance the first stamp 12 into the stamp application position 26. At the same time the free end of the carrier strip 20 travels around the takeup roller 106 under the guidance of the carrier strip guide spring 112 and toward the carrier strip ejection location 28. Gears 100 and 102 of the drive roller 30 and the takeup roller 106, respectively, rotate the rollers 30 and 106 together. The pawl 74 of the advancement actuator mechanism 32 engages each tooth 104 of the ratchet wheel 102 in sequence and incrementally advances the ratchet wheel 102 a uniform distance each time the advancement actuator 32 is operated. The actuator return springs 72 bias the pawl 74 toward withdrawal from the ratchet wheel 102 each time pressure on the cap 52 is removed.

The takeup roller 106 receives the carrier strip 20 from the guide rods 44 and 46 and exerts tension thereon to advance both the carrier strip 20 and the strip of stamps 12 in response to rotation of the drive roller 30 by the actuator mechanism 32.

The stamps 12 remain in contact with the carrier strip 20 until the carrier strip 20 is turned sharply about the turning post 46. At this point, the turn is sharp enough and the strength of adhesion between the pressure-sensitive adhesive on the underside of each stamp 12 and the release agent on the carrier strip 20 is sufficiently weak so that the stamps 12 do not turn about the turning post 46, but rather travel linearly onwardly to the right, as viewed in FIGS. 5 and 6. Each stamp 12 thereupon arrives in sequence at the stamp application location 26.

At this point in the operation of the postage stamp applicator 10, the stamp pressing mechanism 34 is operated. The pressure application return spring 92 normally biases the pressure actuating lever 84 out away from the dispenser body 22, in a clockwise direction of rotation relative to the screws 88 depicted in FIGS. 2, 5, 6, and 7. Actuating pressure is manually exerted upon the lever 84 as each stamp 12 reaches the pressure application location 26. That is, the pressure actuating lever 84 is rotated inwardly toward the dispenser body 22 from the position indicated in phantom at 84' to the position indicated in solid lines in FIG. 7. As the lever 84 is rotated in this manner, the transverse pressure application rib 96 contacts the outwardly facing surfaces of the upright pressure application posts 94, thereby pushing them inwardly toward the dispenser body 22 from the position depicted in FIGS. 5 and 6 to the position depicted in FIG. 7. Since the posts 94 are rigidly secured to the pressure plate 80, the structure formed by the pressure plate 80 and the pressure application posts 94 acts in the manner of a bellcrank in rotating about the axle 82.

When the pressure actuating lever 84 is operated, the flat undersurface of the pressure plate 80 presses downwardly upon the stamp 12 that is currently at the stamp application location 26, and exerts a sufficient force so as to firmly affix that stamp 12 to the envelope 14 located therebeneath due to the pressure-sensitive adhesive on the underside of the stamp 12, and separate it from the exposed end 18 of the stamp roll 16. When the lever arm 84 is released, the pressure application return spring 92 forces it outwardly in rotation away from the dispenser body 22 to thereby clear the feed path to the stamp application location 26 for the next sequential stamp 12.

As best illustrated in FIG. 1, the forwardly projecting arms 48 and 50 serve as spacing or locator indicia for placing the stamps 12 on the corners of envelopes 14. The outside edge of the arm 48 is aligned along the top edge of the envelope, while the intersection of the arms 48 and 50 with the dispenser body 22 is aligned with the side edge of the envelope 14. This positions the stamp application location 26 about one-quarter of an inch inwardly from both the top edge and the side edge at the corner of the envelope 14. With the stamp applicator 10 positioned relative to the envelope 14 in this manner, the lever arm 84 is pressed in toward the dispenser body 22. The stamp 12 at the stamp application location 26 is thereupon applied to the envelope 14 in the upper right-hand corner thereof, approximately one-quarter of an inch in from the right-hand edge and approximately one-quarter of in inch below the top of the envelope 14.

The transparent pressure plate 12 is visible externally of the dispenser body 22, as illustrated in FIG. 1. A user is thereby able to visually confirm the proper position of the stamp relative to the envelope 14 through the transparent pressure plate 80, although the indicia formed by the pressure plate arms 48 and 50 provide a means for properly positioning the postage stamp 12 even without looking at it through the transparent pressure plate 80.

Some rolls of postage stamps no longer employ a separate carrier strip coated with a release agent. Rather, the postage stamps are coated on their undersurfaces with a pressure-sensitive adhesive but are also coated on their faces with a release agent. As a consequence, when postage stamps having this double sided coating are spirally wound in a roll, the release agent film on the face of the postage stamps prevents the pressure-sensitive adhesive on the undersides of the stamps in the roll from adhering to the stamps therebeneath.

Figure 9:
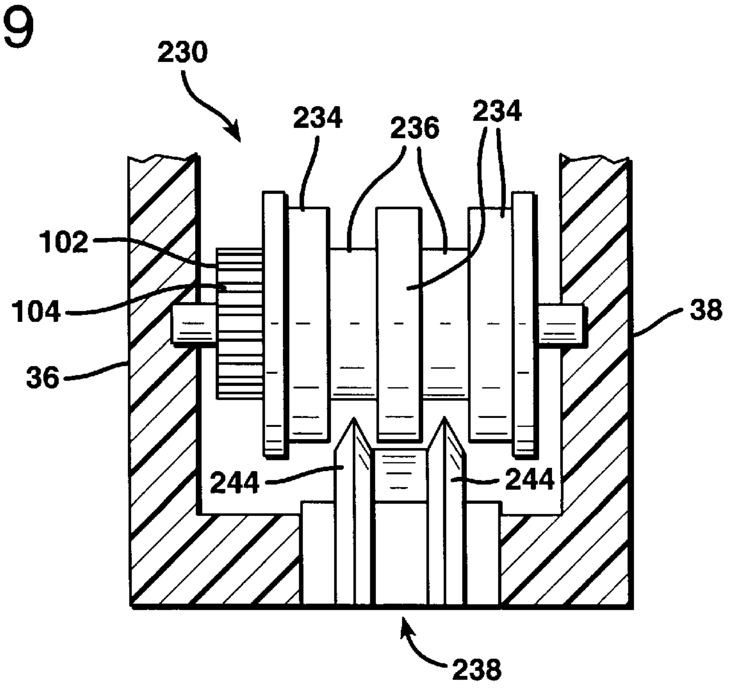
FIG. 9 is a sectional elevational detail taken along the lines 9—9 of FIG. 8.
Figure 4:
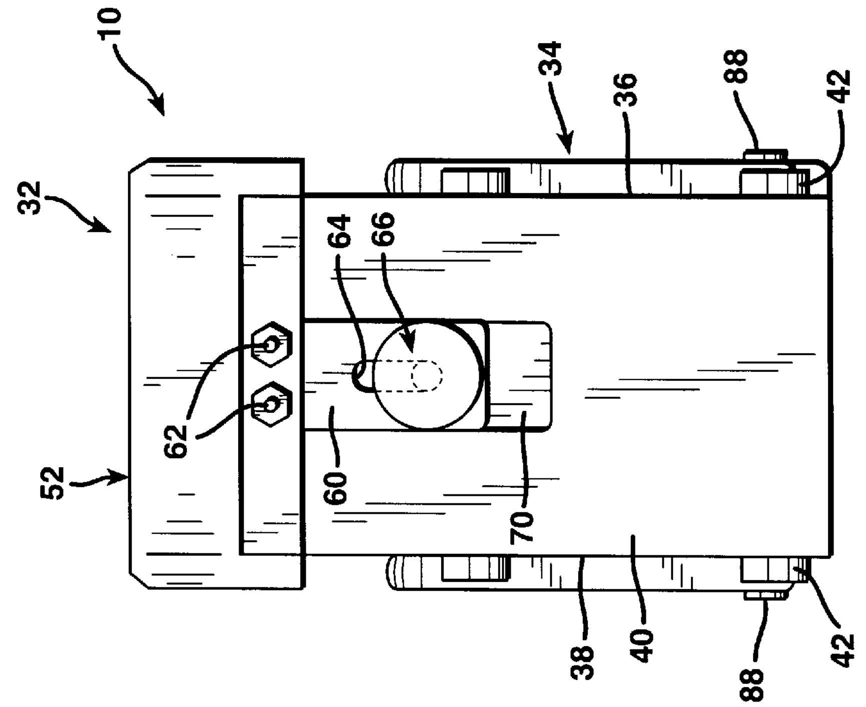
FIG. 4 is a rear elevational view of the stamp applicator of FIG. 1.
Figure 3:
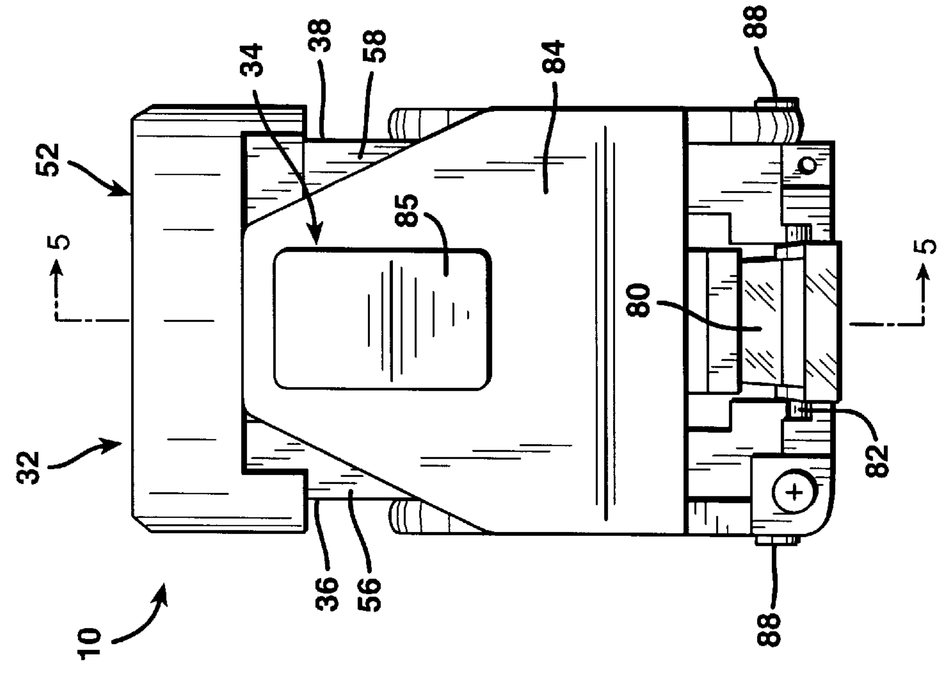
FIG. 3 is a front elevational view of the stamp applicator of FIG. 1.
Figure 8:
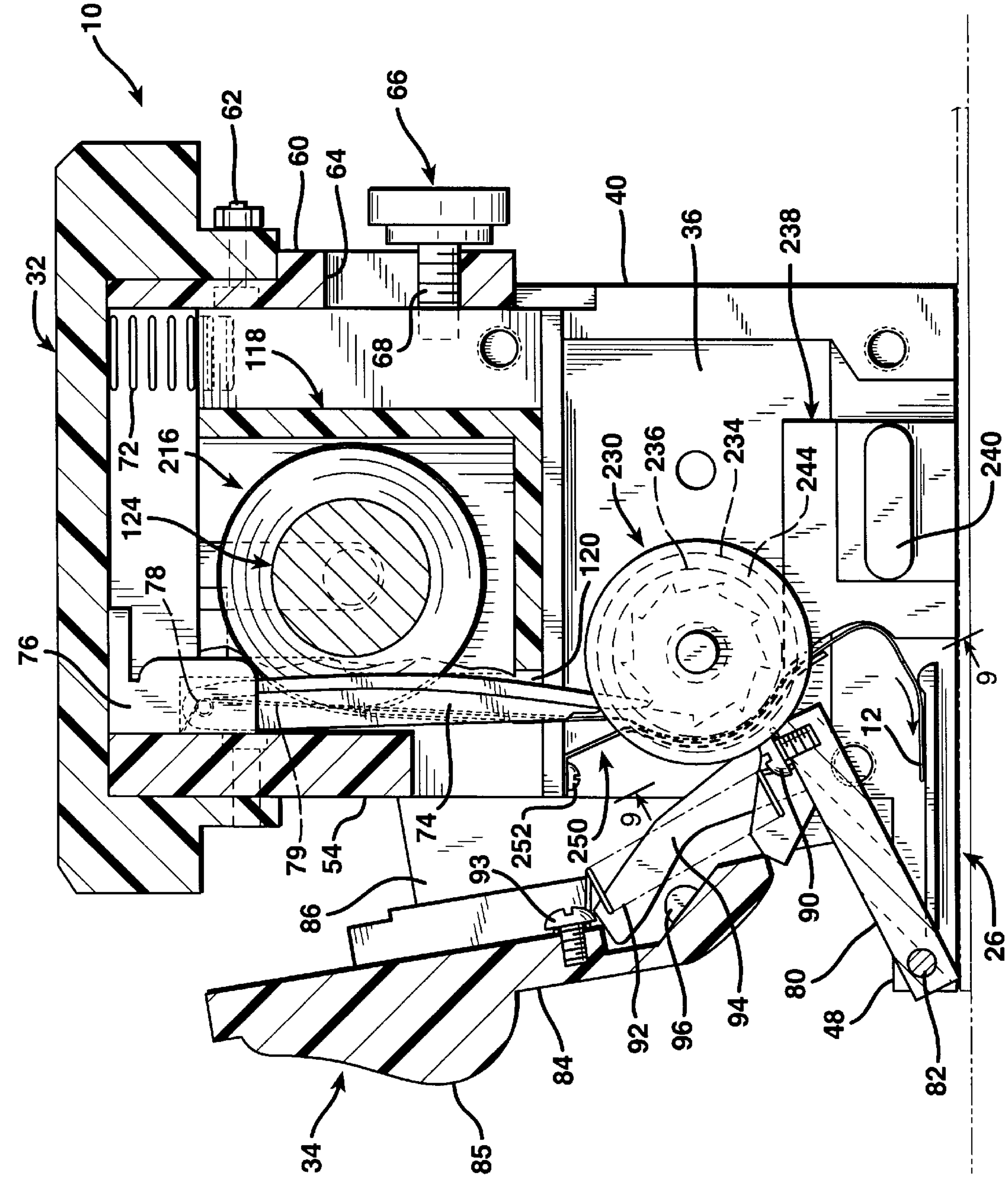
FIG. 8 is a sectional elevation view from the opposite side of the stamp applicator of FIG. 1 fitted with internal components to accommodate a roll of stamps that does not employ a carrier strip coated with a release agent.

The postage stamp applicator 10 of the invention may be utilized with this type of roll of postage stamps as well as the type that employs a separable carrier strip 20, although it is necessary to change certain internal components, as depicted in FIGS. 8 and 9. As illustrated in those drawing figures, the takeup roller 106, the carrier strip guide spring 112, and the transverse guide rods 44 and 46, have been removed from the dispenser body 22, since they are not required for stamp rolls without carrier strips. Rather, a different drive roller 230 is substituted for the drive roller 30. The drive roller 230 has different features and is of a configuration more suitable for advancing stamps 12 in a stamp roll 216 in which no separate carrier strip 20 is employed.

In the embodiment of FIGS. 8 and 9, the roll of stamps 216 is formed by stamps 12 coated on their undersurfaces with pressure-sensitive adhesive and on their faces with a release agent. The drive roller 230 is formed by a traction spool 232 having a plurality of traction disks 234 separated from each other by a smaller plurality of annular channels 236 defined in the traction spool 232 between the traction disks 234. On one of its ends the traction spool 232 is provided with a ratchet wheel 102 having ratchet teeth 104 of the type previously described. The traction spool 232 also includes stub axles 98 that fit into the same pockets in the side panels 36 and 38 as the stub axles 98 of the drive roller 30.

The diameter of the traction spool 232 is smaller at the channels 236 than it is at the traction disks 234. The traction disks 234 provide only a very limited surface contact with the pressure-sensitive adhesive on the underside of the stamps 12 so that only a light peeling force is necessary to dislodge the free end 128 of the stamp roll 216 from the traction disks 234.

To accommodate the stamps of the type wound into the roll 230, it is also necessary to have a different type of guide mechanism. The guide mechanism 238 is mounted to the dispenser base 22 beneath the drive roller 230 between the drive roller 230 and the stamp application location 26 in the feed path of the free end of the stamp roll 216. The guide mechanism 238 includes a pair of oblong, horizontally oriented, laterally projecting lugs 240 that fit into corresponding recesses 242 near the lower extremities and on the inside surfaces of the side panels 36 and 38.

As best illustrated in FIG. 9, the guide mechanism 238 includes a pair of peeling fingers 244 that extend into the annular channels 236 defined in the traction spool 232. The peeling fingers 244 are oriented to extend in the direction from which the free end 218 of the roll of stamps 216 approaches. The peeling fingers 244 peel the exposed end 218 of the strip of stamps 12 free from the traction spool 232. The forward edges of the peeling fingers 244 are arcuately curved so as to redirect the exposed end 218 of the stamp roll 216 in its movement toward the same stamp application location 26 beneath the pressure plate 80.

The guide mechanism components employed in the postage stamp applicator 10 depicted in FIGS. 8 and 9 includes not only the peeling finger guide block 238, but also a postage stamp guide leaf spring 250. The postage stamp guide spring 250 is anchored at one end to the dispenser body 22 by means of a pair of machine screws 252. The central region of the postage stamp guide spring 250 is arcuately curved with a curvature to conform to the diameter of the traction disks 234 over an obtuse angle of contact with the traction spool 232. As illustrated, the stamp guide leaf spring 250 has a central region that extends over an arc of about one hundred twenty degrees relative to the traction disks 234. The postage stamp guide spring 250 serves to guide the free end 218 of the stamp roll 216 about the surface of the traction spool 232. The distal, free end of the stamp guide leaf spring 250 leaves contact with the traction spool 232. The spring 250 exerts a sufficient force against the traction disks 234 for enough traction to exist between the pressure-sensitive adhesive on the underside of the stamps 12 and the traction disks 234 so that rotation of the traction spool 232 draws the stamps 12 off of the stamp roll 216. The traction spool 232 thereby serves as a means for frictionally engaging the exposed end 218 of the stamp roll 216.

In the arrangement depicted in FIGS. 8 and 9, the operation of the advancement actuating mechanism 32 and the stamp pressing mechanism 34 is exactly the same as that previously described. Once depression of the cap 52 has advanced the free end 218 of the strip of postage stamps of the stamp roll 216 to the end of the postage stamp guide leaf spring 250, the peeling fingers 244 dislodge the stamps 12 in sequence from the traction disks 234. Once the stamps 12 have been dislodged from the traction disks 234, the peeling fingers 244 of the guide block 238 direct the stamps in sequential order to the stamp application position 26. The stamp pressing mechanism 34 is then operated in the manner previously described to sequentially apply each stamp 12 to an envelope 14 located therebeneath as each stamp 12 reaches the stamp application position 26.

The traction spool 232 thereby serves as an advancement roller located beneath the stamp roll cavity 24 and above the postage stamp dispensing position 26. Due to the pressure of the spring 250, the exposed end 218 of the elongated strip of the roll of stamps 216 resides in contact with the drive or advancement roller 230 over an obtuse arc of contact therewith. The guide mechanism formed by the peeling finger guide block 238 strips the elongated strip of postage stamps 12 from the advancement roller 230 and directs the stamps 12 to the stamp dispensing position 26. As the cap 52 is released following each operation of the manually operable actuator 32, the pawl 74 is withdrawn from the ratchet tooth 104 with which it was previously engaged. The pawl spring 79 turns the pawl 74 slightly to the rear within the dispenser body 22 thereby bringing the pawl 74 to the next tooth engaging position depicted in FIG. 8.

Undoubtedly, numerous variations and modifications of the invention will become readily apparent to those familiar with office equipment. For example, other types of actuator and stamp pressing mechanisms may be employed to advance the exposed end of the strip of stamps 12 to the stamp application location, and to press the stamps onto envelopes located therebeneath. Accordingly, the scope of the invention should not be construed as limited to this specific embodiment of the invention and modifications thereto illustrated and described.

I claim:

1. A device for dispensing a strip of postage stamps initially mounted on an elongated carrier strip coated with a release agent and formed into a roll and having an exposed end and on which a number of postage stamps of uniform width are sequentially arranged comprising:

a dispenser body carrying said postage stamp roll and defining a stamp application location at its bottom and a carrier strip ejection location distinct from said stamp application location, a drive roller mounted in said dispenser body between said postage stamp roll and said stamp application location so as to engage said exposed end of said strip, said drive roller being operable to unwind said strip from said roll and sequentially advance said stamps thereon to said stamp application location, an advancement actuator mounted on said body and operable to turn said drive roller so as to sequentially advance said stamps to said stamp application location in advancement increments equal to said uniform width of said stamps, a stamp pressing mechanism mounted on said body and operable to sequentially press said stamps onto an envelope located directly beneath said stamp application location, a guide mechanism mounted on said dispenser body to direct said exposed end of said strip of postage stamps toward said stamp application location and to advance said carrier strip to said carrier strip ejection location, and including a carrier strip turning post for separating said strip of postage stamps from said carrier strip and for redirecting said carrier strip, and a take-up roller mounted on said dispenser body and having a traction enhancing surface for engaging said carrier strip so as to maintain tension thereon and including a spring biased carrier strip guide mounted on said dispenser body so as to press said carrier strip against said traction enhancing surface and to guide said carrier strip from said carrier strip turning post as it emanates therefrom about said take-up roller and toward said carrier strip ejection location.

2. A device according to claim 1 wherein said drive roller and said take-up roller are provided with meshed gears that rotate said rollers together, and one of said rollers is provided with a ratchet wheel and said advancement actuator is provided with a pawl that is engageable with said ratchet wheel and incrementally advances said ratchet wheel when said advancement actuator is operated and an actuator return spring that biases said pawl toward withdrawal from said ratchet wheel.

3. A device according to claim 1 wherein said stamp pressing mechanism includes a pressure plate which is hinge mounted for rotation relative to said dispenser body, a pressure application lever hinged to said dispenser body and engageable with said pressure plate and moveable to rotate said pressure plate toward said stamp application location, and a pressure application return spring that urges said pressure plate away from said stamp application location.

4. A device according to claim 1 wherein said drive roller is provided with a ratchet wheel and said advancement actuator is provided with a pawl that is engageable with said ratchet wheel and incrementally advances said ratchet wheel when said advancement actuator is operated, and an actuator return spring that biases said pawl toward disengagement from said ratchet wheel.

5. A postage stamp applicator for applying postage stamps to envelopes wherein said postage stamps are initially mounted on an elongated carrier strip coated with a release agent and have undersurfaces coated with a pressure-sensitive adhesive and are of a uniform width and are initially joined together in a strip wound in a spiral fashion and having an exposed end comprising:

a dispenser body for supporting said spirally wound strip for rotational movement relative thereto and defining a stamp feed path that terminates at a stamp application position defined by said dispenser body and said dispenser body further defines a carrier strip ejection position at a location thereon spaced from said stamp application position, a drive roller mounted in said dispenser body in said stamp feed path, an actuator that rotates said drive roller so as to advance said exposed end of said strip of stamps toward said stamp application position in increments of advancement equal to said width of said postage stamps, a stamp affixation mechanism mounted on said dispenser body and operable to press a stamp at said stamp application position against an envelope located adjacent thereto, a guide mechanism on said dispenser body located between said drive roller and said stamp application position so as to separate said strip of postage stamps from said carrier strip and to guide said strip of postage stamps toward said stamp application position and to guide said carrier strip toward said carrier strip ejection position; and a take-up roller having a traction enhancing surface thereon mounted on said dispenser body and which includes a curved leaf spring that both guides said carrier strip about said take-up roller through an arc of contact therewith greater than ninety degrees and which receives said carrier strip from said guide mechanism and presses said carrier strip against said traction enhancing surface of said take-up roller, and which exerts tension on said carrier strip to advance both said carrier strip and said strip of stamps in response to rotation of said drive roller by said actuator.

6. A postage stamp applicator according to claim 5 wherein said stamp affixation mechanism is provided with a transparent pressure plate visible externally of said dispenser body.

7. A postage stamp applicator according to claim 6 wherein said transparent pressure plate is provided with spacing indicia to aid in properly aligning said transparent pressure plate with an envelope located therebeneath.

8. A postage stamp applicator according to claim 5 wherein said drive roller is provided with a ratchet wheel and said advancement actuator is provided with a pawl that is engageable with said ratchet wheel and incrementally advances said ratchet wheel when said advancement actuator is operated, and an actuator return spring that biases said pawl toward disengagement from said ratchet wheel.

* * * * *